United States Patent [19]

Toriumi et al.

[11] 4,086,469
[45] Apr. 25, 1978

[54] MICROFICHE READER CONTROL MEANS

[75] Inventors: Shiro Toriumi, Machida; Hiroshi Endo, Fuchu, both of Japan

[73] Assignee: Minolta Camera K.K., Osaka, Japan

[21] Appl. No.: 706,562

[22] Filed: Jul. 19, 1976

Related U.S. Application Data

[63] Continuation-in-part of Ser. No. 624,577, Oct. 21, 1975, abandoned.

[30] Foreign Application Priority Data

Nov. 2, 1974 Japan ............................. 49-126864

[51] Int. Cl.² ...................... G06M 3/02; G03B 23/08
[52] U.S. Cl. ........................ 235/92 MP; 235/92 CA; 235/92 PE; 235/92 R; 353/27 A
[58] Field of Search ......... 235/92 PL, 92 PE, 92 MP, 235/92 CA, 92 DM, 92 CT; 353/27 A, 27 R

[56] References Cited

U.S. PATENT DOCUMENTS

| | | | |
|---|---|---|---|
| 3,594,551 | 7/1971 | Shearer et al. | 235/92 PL |
| 3,614,631 | 10/1971 | Bevier et al. | 235/92 PL |
| 3,814,909 | 6/1974 | Hewitt | 235/92 MP |
| 3,841,747 | 10/1974 | Peroutky | 353/27 A |
| 3,870,413 | 3/1975 | Goebel | 353/27 A |

*Primary Examiner*—Joseph M. Therz
*Attorney, Agent, or Firm*—Wenderoth, Lind & Ponack

[57] ABSTRACT

A microfiche reader control means which permits direct keying of the number of a required microfilm frame. A keyed number is converted to values indicative of required displacement of a microfiche from an index position in order to bring the frame having the keyed number to a position for projection and viewing, and these values are supplied to drive means for moving the microfiche.

4 Claims, 6 Drawing Figures

MICROFICHE READER CONTROL MEANS

This application is a continuation-in-part of our copending application Ser. No. 624,577, filed on Oct. 21, 1975 now abandoned and entitled Microfiche reader control means.

The present invention relates to a microfiche reader control means. More particularly the invention relates to a microfiche reader control means permitting direct keying of a microfiche frame number, without the necessity for a user to calculate the requisite coordinate values of the required frame in an array of frames on the microfiche.

To deal with the increasing amounts of data made available in various institutions it has been found convenient to store data in microfilm form, which offers the advantages of considerable reduction both of storage space requirements and of weight of the data storage medium. One manner of storing and arranging microfilm itself is to provide a plurality of microfilm frames in a rectangular array on a transparent support sheet known as a microfiche. In order to examine the content of a particular frame on a microfiche, the microfiche must be inserted into a reader means which comprises magnification, focussing and projection means for projection of a viewable, enlarged image of data contained on a frame onto a viewing screen or copying medium, for example, and the microfiche must be moved relative to the projection means until it is brought to a position, termed a 'projecting position', whereat the content of the required frame is projected onto the screen or copying medium. To bring a frame to the projecting position either the microfiche may be moved while the projection system is held stationary, or vice-versa, or both microfiche and projection system may be moved. However, since the projection means is precision means and displacement of components therein from particular settings relative to one another must be kept extremely small, it is the usual practice to move only the microfiche.

Frames being disposed in a rectangular array on the microfiche, the most convenient way of locating a particular frame is to bring the microfiche to a position termed the 'index position', which is a position wherein the frame identified as Frame No. 1 on the microfiche is at the projecting position, and then, presuming Frame No. 1, is not the required frame, to move the microfiche a certain number of units along axes which are referred to below as the X axis and the Y axis, and are parallel to the columns and lines respectively of the frame array, units along the X axis, or 'X units' being each equal to the length of a frame, and units along the Y axis, or 'Y units' being each equal to the width of a frame.

A microfiche reader for effecting such displacement is shown in FIG. 1 and may be seen to comprise a reader control panel A, on which there is provided a power connection switch B, banks of keys C which are for designation of a required frame of a microfiche, and also include a set of keys D for start, return, or fine adjustment movement of the frame, and an indicator E which, for check purposes shows the number of the frame in the position for viewing. A microfiche containing a frame to be viewed is inserted manually into the reader means via a guide F, and when thus inserted closes switches (not shown) which supply a signal to a control unit (not shown), and in response the control unit actuates rolls G and H through drive means (not shown) for drawing the microfiche onto a carrier J which is slidably mounted on a slidable support K, and moving the microfiche to the index position. The slidable support K is slidable along rails formed between front and rear portions of the reader fixed base L and is free to be moved along the Y axis, while the carrier J is constrained to move together with the slidable support K along the Y axis, but is free to be moved with respect to the support K along the X axis, movement of the carrier J and support K being effected for example by draw wires (not shown) which are connected thereto and are also wound around output shafts of suitable motors (not shown). Movement of the microfiche to the index position is effected independently of input to the banks of keys C, i.e., of the designated X and Y axis coordinates. Input of the keys C becomes effective upon depression of the start key in the set of keys D, which causes the carrier J and slidable support K to be moved the designated number of X units and Y units to bring the required microfiche frame to the projecting position above which there is provided a lens N which forms part of an optical system including reflecting mirrors P and Q for projection of a magnified image of the frame onto a screen S. Arrival of the required frame at the projecting position is detected and causes opening of a shutter means R, whereupon light from a light source T, which is actuated upon closure of power connection switch B, is directed onto a mirror U and reflected thereby through the frame to the lens N.

The microfiche readers having a construction as described above may be broadly divided into two systems, i.e., one wherein a particular frame of the microfiche is designated by separate columns and rows (i.e., X and Y coordinates), and the other wherein a particular frame is designated by a series of numbers. It is to be noted that the microfiche reader according to the present invention has the latter system employed therein. FIG. 2 shows an arrangement of a microfiche M employed in the latter system, in which microfiche M, frames are disposed in an array of eight lines or rows corresponding to the Y axis and identified by the letters of the Roman alphabet $a$ through $h$, and ten columns corresponding to the X axis and identified by the Arabic numerals "1" through "10". In the former system in which the particular frame is designated by columns and rows, keys are depressed in such a manner, for example, as "b-s", while in the latter system of frame designation of the present invention, the frames are numbered consecutively from decimal "1" to "80" going down successive columns, and starting with the leftmost column. It is to be noted here that the particular frame designated as "b-3" in the former system is to be designated as "18" in the latter system. In the designation of the consecutive numbers in the above described manner, however, there exists such an inconsistency that while the user would normally count from "1", the counter of a control circuit counts from "0". In other words, on the assumption that a frame "18" is designated, the counter counts up to 18, in which case, however, the counter actually starts counting from 0, and upon counting 18, the frame number "19" is really meant, thus giving rise to inconveniences that the frame number "19" is brought into the projecting position despite the fact that the frame "18" is designated.

It is accordingly an object of the present invention to provide a microfiche reader control means permitting automatic location of a microfiche frame.

It is a further object of the invention to provide a microfiche reader control means permitting a user to specify the frame number only of a required frame, and not requiring specification of coordinates of a frame in order to effect frame location.

In accomplishing these and other objects there is provided, according to the present invention, a microfiche control means wherein the number of a required frame in an array of $m$ rows and $n$ columns is decremented by "1", and then divided by the decimal value of $m$. The quotient and remainder obtained by this division represent the number of units with which a microfiche is required to be moved along the X axis and Y axis respectively of the frame array, starting from an index frame, in order to bring the required frame to a projecting position.

A better understanding of the present invention may be had from the following full description of one preferred embodiment thereof when read in reference to the attached drawings in which.

Before the description of the present invention proceeds, it is to be noted that like parts are designated by like reference numerals throughout the attached drawings.

Figure 3:
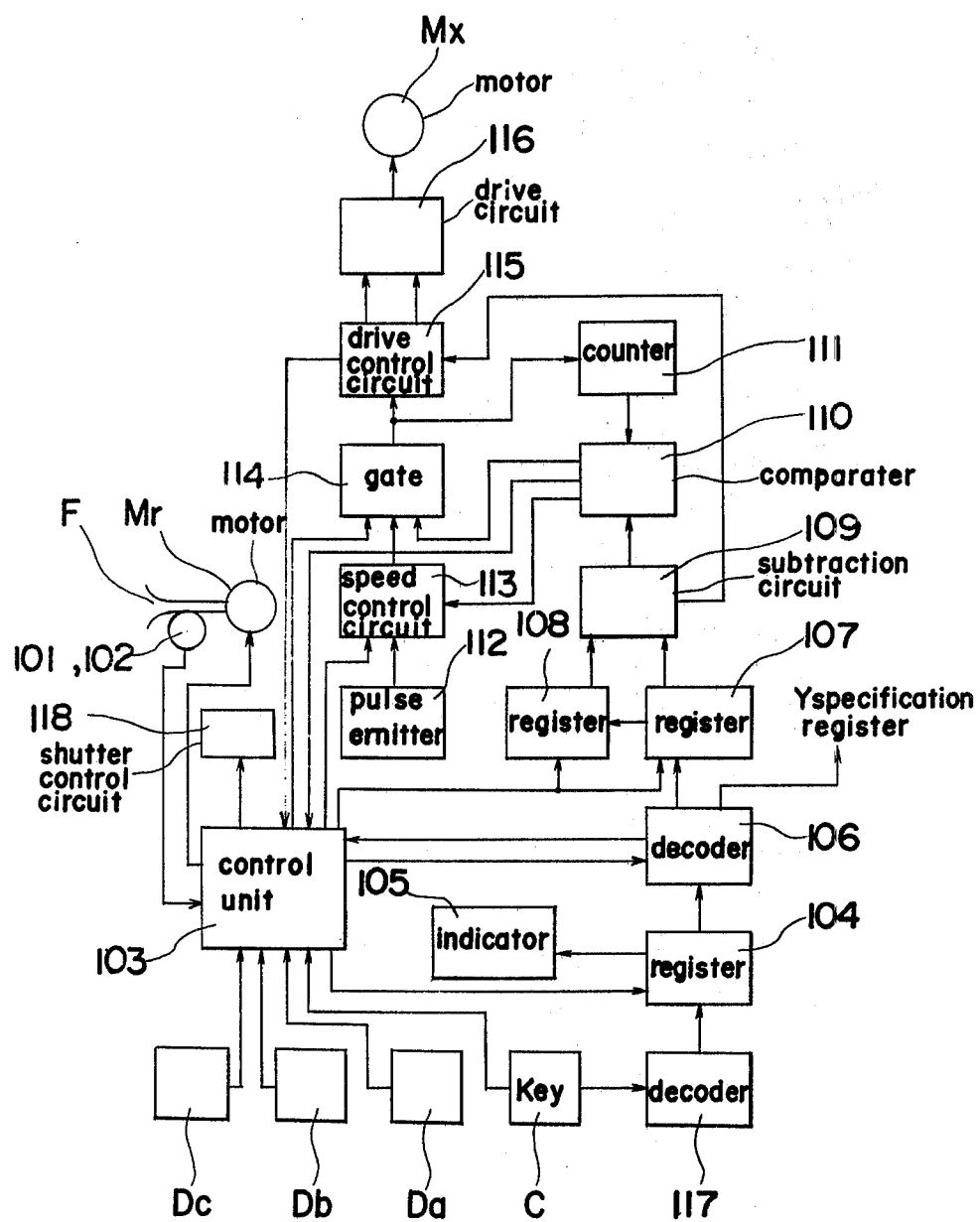
FIG. 3 is a block diagram of a control circuit for microfiche frame location according to one embodiment of the invention.

Circuit means for achieving the earlier mentioned location of frames is shown in block diagram form in FIG. 3, to which reference is now had. FIG. 3 shows only the circuit portion relating to X axis movement, it being understood that circuit construction and action relating to Y axis movement are identical except that a control unit 103 acts to cause drive of the slidable support K (FIG. 1) between the loading/unloading position and index position while input to an X axis motor Mx is stopped. A motor Mr for the rolls H and G (FIG. 1) is actuated by the control unit 103 upon receipt by control unit 103 of input from a two-input AND gate receiving input from switches 101 and 102. The motor Mr remains actuated for a set time after termination of this input to control unit 103. The number of the first required frame is keyed in on the key assembly C, whose content is supplied to a decoder 117 for conversion thereof from a decimal to a binary-coded decimal format, while at the same time a signal indicating that a frame number has been keyed is supplied to control unit 103, this signal being added to a signal from the start button Da of the keys D actuated later. Decoder 117 content is supplied to and stored in an input register 104, which supplies corresponding output to a frame indicator 105 which permits the user to check that the correct number has been keyed, and to a decoder 106 which converts the value into corresponding values of X and Y corrdinates. Upon completion of decoding, decoder 106 supplies a signal indicating completion to control unit 103 which emits a signal ordering decoder 106 content relative to the X axis to be set in an X coordinate specification register 107, Y axis data being similarly supplied to a Y coordinate specification register (not shown). X coordinate register 107 content is supplied to a subtraction circuit 109 which also receives input from a register 108 storing the X coordinate value of the previously selected frame of a particular microfiche. When a microfiche is initially loaded into the reader, control unit 103 sets a "1" in previous frame register 108. The absolute value of the result obtained by subtraction circuit 109 is supplied to a comparator 110, and the sign of the result is sent to a forward and reverse drive control circuit 115, which causes reverse drive of motor Mx if the sign is minus and forward drive thereof if the sign is plus. Comparator 110 compares subtraction circuit 109 input with input from a pulse counter 111.

Pulses to drive X axis motor Mx are emitted constantly by a pulse emitter 112 subsequent to actuation of start button Da of the set of keys D also including return and fine adjustment keys Db and Dc, and are supplied through a speed control unit 113, a gate 114, forward and reverse drive control circuit 115 to a drive circuit 116, which drives motor Mx.

Figures 1, 2:
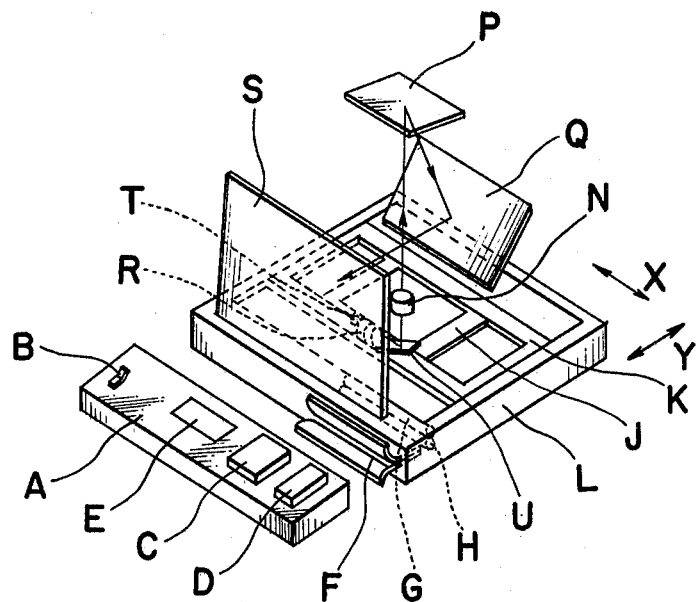
FIG. 1 is a perspective view of an example of a microfiche reader means referred to in the foregoing description.
FIG. 2 is a schematic view of an example of an array of microfilm frames on a microfiche.

As well as being supplied to drive control circuit 115, pulses exiting from gate 114 are also supplied to pulse counter 111. Upon coincidence of inputs from pulse counter 111 and subtraction circuit 109, comparator 110 supplies a signal to close gate 114 and so stop motor Mx. At the same time comparator 110 also sends a signal indicative of coincidence to control unit 103. This signal is maintained until designation of another frame by means of the key assembly C. Upon receipt of a corresponding signal from the comparator for Y axis movement, control unit 103 supplies actuating input to a shutter control circuit 118, and circuit 118 causes energization of a solenoid and plunger assembly (not shown), thereby opening shutter R (FIG. 1). Thus, if the value of the X coordinate of the previously selected frame were "2" and that of the currently required frame "8", the result obtained by subtraction circuit 109 would become "+6". In such a case, drive control circuit 115 causes forward drive to motor Mx, which moves carrier J leftwards as seen in FIG. 1 until the count of pulse counter 111 supplied to comparator 110 reaches "6" and gate 114 is closed, shutter R being opened when slidable support K reaches the required Y axis coordinate.

The speed control circuit 113 receives input from comparator 110 and control unit 103. The control unit 103 causes drive speed to be reduced during start of motor Mx, i.e., just after actuation of start key Da, to avoid problems of starting torque. Comparator 110 supplies input to cause reduction of speed when the difference between the values of input from pulse counter 111 and subtraction circuit 109 becomes lower than a certain value, in order to avoid excessively sudden stopping and possible overshooting of carrier J.

Figure 4:
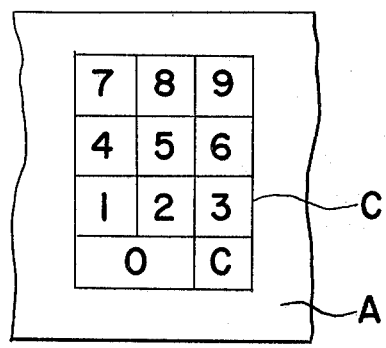
FIG. 4 is a schematic view of frame designation keys employable in association with the means of the invention.

In FIG. 4 there is shown a bank of keys C which is employable in association with the means of the invention, and may be seen to be a simple arrangement of keys identified by the numerals 0 to 9. With this bank of keys C, the user is not required to specify coordinates of a required frame, but may key the number of the frame directly, keying higher order numbers first, e.g., if the number of the required frame is "18", the user first depresses the key marked "1" then the key marked "8".

Figure 5:
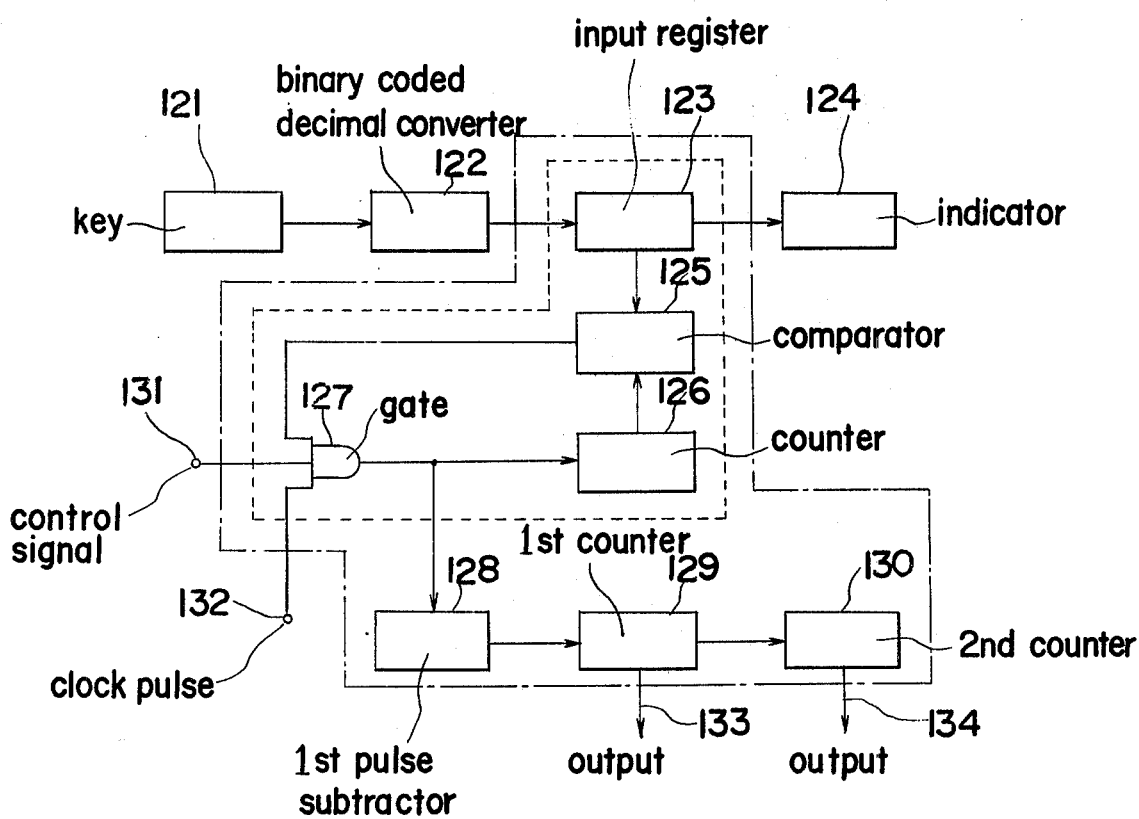
FIG. 5 is a block diagram of a microfiche reader control means according to the invention.

According to the invention this mode of frame designation is made possible by the control means shown in block diagram form in FIG. 5, to which reference is now had. Decimal number content designated by a bank of keys 121 (equivalent to the key C in FIGS. 1 and 3) is converted to binary-coded decimal format by a decimal to binary coded decimal converter 122 (equivalent to the decoder 117 in FIG. 3), the output of which is set in an input register 123 (equivalent to the input register 104 in FIG. 3). The content of input register 123 is supplied to an indicator 124 (equivalent to the frame indicator 105 in FIG. 3), to permit a user to check that the correct number has been keyed, and is also supplied as input to a comparator 125 during the entire action for frame positioning. Comparator 125 also receives input from a pulse counter 126 and while there is lack of coincidence between input of counter 126 and resister 123, supplies input to a three-input AND gate 127, which receives input in the form of control signals through a terminal 131 supplied from a start switch (not shown), and clock pulses through a terminal 132, and the output of which is supplied as input to counter 126 and via a first pulse subtractor 128 to a first counter 129 and second counter 130.

It should be noted here that the first pulse subtractor 128 functions to subtract "1" from the number of the input pulses supplied thereto for producing corresponding output therefrom, (more specifically, if the input pulses are represented by Pi, the output developed from the first pulse subtractor 128 equals (Pi-1)), and that the comparator 125, counter 126, gate 127, first pulse subtractor 128, first counter 129, and second counter 130 of FIG. 5 constitute the decoder 106 mentioned with reference to FIG. 3. It should also be noted that the terminals 131 and 132 to which the control signals and clock pulses are applied respectively are connected to the control unit 103 of FIG. 3, while the output terminal 134 from the second counter 130 is coupled to the register 107, with the output terminal 133 from the first counter 129 being connected to the Y specification register also referred to in FIG. 3. The gate 127 thus passes the clock pulses 132 only when there is present input from the control signals 131 and from signals comparator 125. In other words, after actuation of the start switch (not shown), the gate 127 passes the clock pulses 132 until the number of pulses 132 passed equals the number set in register 123. The first pulse subtractor 128 acts to prevent the first clock pulse passed by gate 127 from being supplied to counters 129 and 130, but allows supply of subsequent clock pulses thereto. The first counter 129 is so adapted to count up to particular number of pulses supplied thereto and upon receipt of every particular number of pulses, the content thereof is cleared and in turn the second counter 130 is incremented by one. Thus, if the first counter 129 can count up to decimal "7", its content is cleared upon receipt of each eighth pulse and supplies an input of "1" to the second counter 130. Thus, for example, if a total of ten pulses is supplied to the first counter 129, upon termination of input, the first counter 129 holds the value "2" in decimal and the second counter 130 the value "1". Upon coincidence of register 123 input and counter 126 input to the comparator 125, the gate 127 is closed to terminate input of pulses and thereupon, the contents of the first counter 129 and the second counter 130 are respectively supplied to the Y specification register and X specification register 107 referred to in FIG. 3. The control means connected to the registers described above in association with FIG. 3 determine the number of frames the microfiche must move to bring the designated frame to the projection position by comparing the position of previously selected frame with the contents of the first and second counters 129, 130 supplied to respective registers 107, and sequence, energizes the pulse motors Mx and My to move the slidable support K and second requisite number of X units and Y units to bring the required frame to the projecting position. As may be seen, if the microfiche is at the index position, i.e., if the frame of Frame No. 1 is at the projecting position, then the outputs 133, 134 from the first and second counters 129, 130 would respectively be the amount of units which the microfiche must be moved in the Y and X directions. Needless to say the same results are achieved if the carrier J and slidable support K are driven by means other than those described above.

Supposing for example that the required frame is Frame No. 18, key "1" and key "8" of the bank of keys 121 are depressed in turn which results in the value "18" being stored in input register 123, displayed in indicator 124 and continuously supplied to comparator 125. Next the start key is depressed resulting in initial clearance of all circuits and in supply of signals 131 to gate 127, and, input from the counter 126 to the comparator 125 being "0" at this time, the comparator 125 also supplies input to the gate 127, which therefore passes a clock pulse 132 to the counter 126 and to the first pulse subtractor 128 and the counters 129 and 130. This clock pulse 132 is counted by the counter 126 the content of which therefore becomes "1", but is prevented by the first pulse subtractor 128 from reaching the first counter 129, and the first counter 129 and second counter 130 therefore both have a content of "0". The next clock pulse 132 increments the content if counter 126 by "1", and bypasses the first pulse subtractor 128 and is supplied to the first counter 129. At this stage therefore the counter 126 content is "2", that of the first counter 129 is "1", and that of the second counter 130 is "0", and the comparator 125 continues to supply input to the gate 127 since the input of "2" from the counter 126 is not equal to the input of "18" from register 123. The total number of the clock pulses 132 supplied to the first counter 129 is one less than the total number supplied to the counter 126 since subsequent clock pulses 132 bypass the first pulse subtractor 128 and are all supplied to the first counter 129. Thus the eighteenth clock pulse passed by the gate 127 brings the count of the counter 126 to "18" and the total of clock pulses supplied to the first counter 129 to "17".

Input to the comparator 125 from both the resister 123 and counter 126 now being "18", the comparator 125 stops supply of input signals to the gate 127, which therefore passes no further clock pulses. A total of seventeen pulses having been supplied to the first counter 129, and the first counter 129 having been cleared and content of the second counter 130 having been incremented by "1" upon receipt of each eighth clock pulse by the first counter 129, the content of the first counter 129 is now "1" and that of the second counter 130 is "2". These contents are then respectively supplied to the Y specification register and X specification register 107 of FIG. 3 to move the microfiche requisite units in Y and X directions by energizing the pulse motors Mx, My, so that Frame No. 18 is moved to the projection position. As has been explained, the outputs of first and second counters 129, 130 would be the requisite units the microfiche is moved in Y and X directions if the microfiche is at the index position. Thus, since the user may key the number of any frame directly without having to make any calculation, the means of the invention permits saving of time and avoidance of error.

Figure 6:
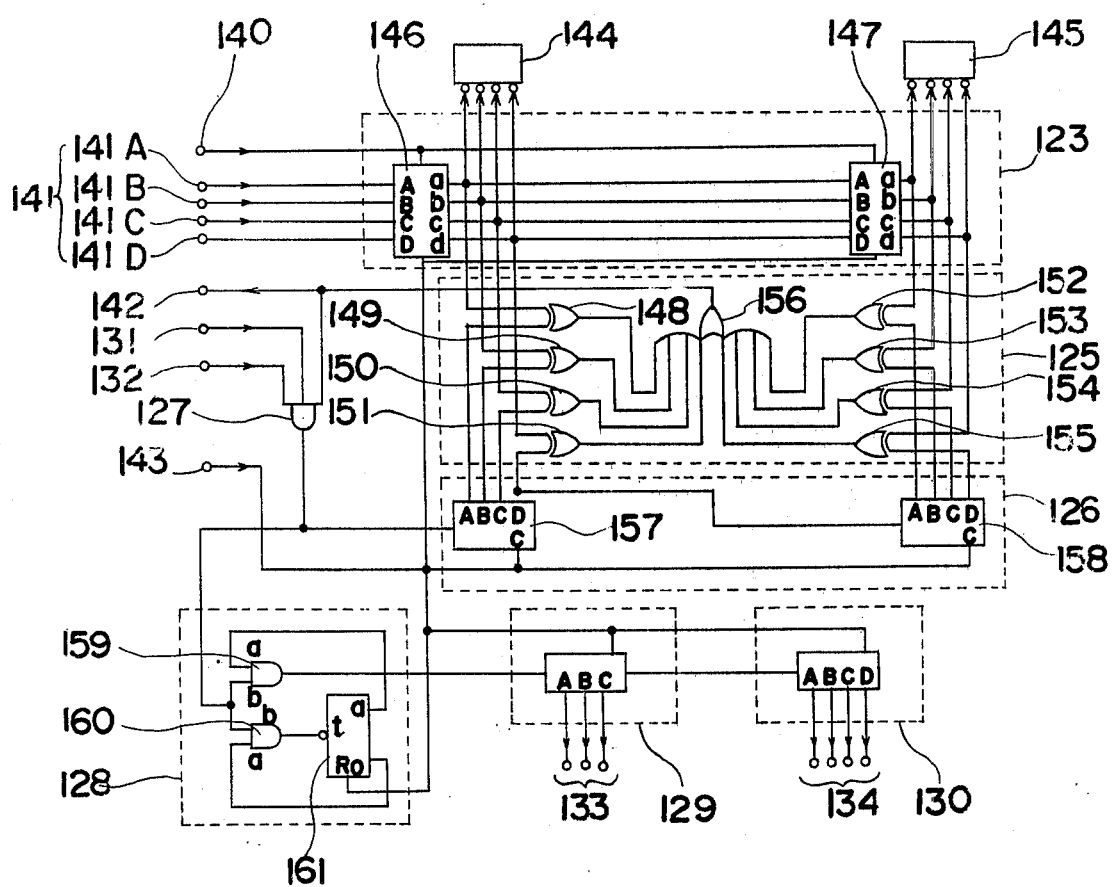
FIG. 6 is a schematic circuit diagram of the means of FIG. 5.

A circuit for achieving the abovedescribed action is shown in greater detail in FIG. 6, to which reference is now had. In FIG. 6, circuit portions corresponding to block portions of FIG. 5 are shown enclosed by dashed lines and are identified by corresponding numbers. The input register 123 is constituted by a parallel-in parallel-out shift register including two 4-bit flip-flops 146 and 147, each having output terminals *a* through *d*, and input is suppliable thereto from the bank of frame specification keys 121 (FIG. 5) via input terminals 141A through 141D. The first number specified by the bank of keys 121 is supplied into the flip-flop 146 upon occurrence of the initiating edge, in this circuit the positive edge, of a signal produced when a start key or any one of the keys in the bank of keys 121 is depressed for example. Upon arrival of the negative edge of signal 140, the content of the flip-flop 146 is shifted into the flip-flop 147, and the value of the next key 121 depressed, if any, is set in the flip-flop 146. After this, the states of the flip-flops 146 and 147 are maintained until arrival of a reset signal 143, and output from output terminals 146*a* through 146*d* and 147*a* through 147*d* is supplied to display panels 144 and 145 of the indicator 124 and to the comparator 105 (FIG. 5). In the indicator 124 the panel 145 which displays the content of the flip-flop 147, i.e., the 'tens' column of the number of the required frame if this frame number is a two-figure number, is on the left of the panel 144 as seen by the user. If the number of the required frame is less than ten, only one figure is displayed by indicator 124, this figure being shown in the panel 145. Needless to say, although the input register shown in the drawing may not be used for storing values in excess of decimal "99", the register 123 may be easily adapted to storage of values up to decimal "999" by provision of an additional 4-bit flip-flop.

The comparator 125 is constituted by two-input exclusive-OR gates 148 through 155 all of whose outputs are supplied as input to an OR gate 156. Each of the exclusive OR gates produces an output when there is an input signal present at one, but not both, of its input terminals, and OR gate 156 produces an output when input is received from any one of the exclusive OR gates 148 through 155.

The counter 126 also supplying input to the comparator 125 is constituted by a binary-coded decimal register consisting or two counters 157 and 158, each of which may store four bits and has corresponding output terminals A through D. Clock pulse input is supplied to the counter 157 from the gate 127, the counter 157 being cleared and the counter 158 being incremented by "1" upon arrival of each tenth clock pulse at the counter 157.

Presuming a two-figure frame number is specified by the keys 121, the exclusive-OR gates 148 through 151, are associated with the 'ones' unit value of the specified number and receive input from the flip-flop 146 and from the counter 157, and the exclusive OR gates 152 through 155 are associated with the 'tens' unit value of the specified number, and receive input from the flip-flop 147 and counter 158. In more detail, one input terminal of the exclusive OR gate 148 receives input from the output terminal 146*a* of the flip-flop 146, and the other input terminal thereof receives input from the output terminal 157A of the counter 157. Similarly, the gates 149, 150, and 151 respectively receive input from output terminals 146*b*, 146*c* and 146*d* of the flip-flop 146 and from output terminals 157B, 157C and 157D of the counter 157, and the gates 152, 153, 154 and 155 respectively receive input from output terminals 147*a*, 147*b*, 147*c*, and 147*d* of the flip-flop 147 and from output terminals 158A, 158B, 158C and 158D of the counter 158. Thus, unless there is complete coincidence of the content of the flip-flop 146 with that of the counter 157, and of content of the flip-flop 147 with that of the counter 158, at least one of the exclusive-OR gates 148 through 155 produces an output, and therefore the OR gate 156 also produces an output which is supplied to the gate 127 and, in the presence of the signals 131 permits the clock signals 132 to be passed through the gate 127. Since the signals 131 are emitted subsequent to depression of a start button, passage of clock pulses 132 through the gate 127 is dependent on receipt by the gate 127 of input from the OR gate 156. Upon coincidence of the flip-flop 146 and counter 157 content and of the flip-flop 147 and counter 158 content, there is no output from any of the gates 148 through 155, and the gate 156 output therefore ceases and the gate 127 is closed.

The gate 127 output is supplied to the counter 157, as described above, and is also supplied through the first pulse subtractor 128, described below to counters 129 and 130. The counter 129 is a 3-bit counter with corresponding output terminals 133 and may count up to decimal "7", and the counter 130 is a 4-bit counter with output terminals 134 and may count up to at least decimal "10". As noted earlier, the counter 129 is cleared and content of the counter 130 is incremented by "1" upon arrival of each eighth pulse at the counter 129. Upon closure of the gate 127, a signal supplied from the OR gate 156 along a line 142 causes content of the counter 129 and content of the counter 130 to be supplied to power input means associated with servo amplifiers (not shown) respectively, whereby the slidable support K and carrier J (FIG. 1) are actuated to be moved by requisite amounts through drive means (not shown). A signal to cause transfer of the counter 129 and counter 130 content to the power input means may be produced, for example, by providing on the line 142 an inverter, which produces an output only when no input is received from the OR gate 156.

The first pulse subtractor 128 is constituted by an AND gate 159, AND gate 160, and trigger, or *t* flip-flop 161. The AND gate 159 has two input terminals 159*a* and 159*b* and receives as input the clock pulses 132 which are supplied through the gate 127 to the input terminal 159*b* and set output of *t* flip-flop 161 which is supplied to the input terminal 159*a*. Output from the AND gate 159 is supplied to the first counter 129. The AND gate 160 also has two input terminals 160*a* and 160*b*, and receives as input the clock pulses 132 which are passed through the gate 127 and supplied to input terminal 160*b* and reset output from *t* flip-flop 161 which is supplied to the input terminal 160*a*. Output from the AND gate 160 constitutes triggering input to *t* flip-flop 161, which is triggered by the negative-going edge of this input signal. At the start of circuit action, *t* flip-flop 161 is reset by a signal 143 which is supplied upon initial actuation of one of the keys 121, for example, and also clears all other storage elements in the control circuit. The signal 143 may of course also be supplied upon actuation of a separately provided clear switch. In the first pulse subtractor 128, since *t* flip-flop 161 is in its reset state when the first clock pulse 132 is passed by the gate 127, the AND gate 159 has no input at its input terminal 159a and so produces no output, despite supply of a clock pulse to the input terminal 159b, but there is an input at the input terminal 160b of the AND gate 160, which therefore produces an output signal to the trigger to flip-flop 161 upon arrival of the clock pulse at the input terminal 160a. The reset output of t flip-flop 161 therefore goes to "0" and the set output thereof goes "1", whereby an input is supplied to the input terminal 159a of the AND gate 159 which is thus made ready to pass subsequent clock pulses 132 supplied thereto, and input is removed from the input terminal 160b of the AND gate 160, which is therefore closed, with the result that no triggering input is supplied to t flip-flop 161. The t flip-flop 161 therefore remains in its set state and the AND gate 160 cannot be re-opened until that flip-flop 161 is reset by a signal 143, at which time, the AND gate 160 is again closed. Thus clock pulses 132 subsequent to the first clock pulse are supplied to and counted by the counters 129 and 130. The t flip-flop 161 having been triggered by the negative-going edge of the output signal from the AND gate 160, the first clock pulse 132 is unable to be passed by the AND gate 161.

Taking the example above in which the number of the required frame of the microfiche is "18", action of the abovedescribed circuit may be illustrated as follows. Depression of key "1" of the bank of keys 121 results in "1" on line 141A and "0" on lines 141B, 141C and 141D, these values being transferred to input terminals 146A through 146D of the flip-flop 146. Depression of key "8" results in a "1" on line 141D and a "0" on lines 141A, 141B and 141C, these values being transferred into the flip-flop 146 and previously registered content of the flip-flop 146 being transferred into the flip-flop 147, these actions coinciding with occurrence of positive and negative edges of signal 140. The output terminals 146a, 146b, and 146c of the flip-flop 146 now hold "0" and output terminal 146d holds "1", while the output terminals 147b, 147c and 147d of the flip-flop 147 hold "0" and the output terminal 147a holds "1", and content of all other register or counter elements in the circuit consists entirely of "0", because of resetting effected by the reset signal 143. The value "18" is displayed by the indicator 124, and an input is supplied to one input terminal of the exclusive OR gate 151 by the output terminal 146d of the flip-flop 146, and to one input terminal of the exclusive OR gate 152 by output terminal of the flip-flop 147. There being no other input supplied to the exclusive OR gates 148 through 155, the gates 151 and 152 produce an output which is supplied to the OR gate 156, and the OR gate 156 produces an output which permits the gate 127 to pass the clock pulses 132 upon actuation of a start switch to produce signals 144.

The first clock pulse is supplied to the counter 157 the output terminal 157A of which therefore produces a "1", but, because of the action of the first pulse subtractor 128, not to the counter 129, whose content therefore remains "0", other output terminals of the counter 157 and all output terminals of the counter 158 producing "0", and content of the counter 130 also being "0". Subsequent clock pulses are supplied to the counter 129 and increment the content thereof, and also increment the content of the counter 157. The exclusive OR gates 151 and 152 both continue to produce output to hold the gate 127 open until arrival of the eighth clock pulse. Arrival of the eighth clock pulse brings the value of the output terminal 157D of the counter 157 to "1", whereby input to both input terminals of the exclusive OR gate 151 becomes "1", and the gate 151 therefore temporarily ceases to produce an output. The exclusive OR gate 152, however, continues to produce an output since it is receiving input at only one input terminal, from the output terminal 147a of the flip-flop 147. This situation continues until arrival of the tenth clock pulse, whereupon the counter 157 is cleared to "0", resulting in continued output from the exclusive OR gate 151, and output terminal 158A of the counter 158 produces a "1", thus terminating output from the exclusive OR gate 152. A total of nine pulses having been supplied to the counter 129, the content of counter 129 is therefore now "1" (129A = 1, 129B = 0, 129C = 0) and that of the counter 130 also is "1", (130A = 1, 130B = 0, 130C = 0). The exclusive OR gate 151 continues to produce output until the value at the output terminal 157D of the counter 157 is "1" and coincides with that of the output terminal 146 of the flip-flop 146, i.e., until arrival of the eighteenth clock pulse at the counter 157, this clock pulse being the seventeenth clock pulse supplied to the counter 129. Input to the OR gate 156 is now stopped thereby closing the gate 127, and the counter 129 and counter 130 respectively hold "1" and "2" (i.e., 129A = 1, 129B = 0, and 130A = 0, 130B = 1, 130C = 0). Arrival of the signal supplied by the OR gate 156 along the line 142 causes content of the counter 129 and of the counter 130 to be supplied to the power input means of the servo amplifiers (not shown) respectively, and the frame location means is moved two X units and one Y unit away from the index position, provided that the frame of Frame No. 1 is initially at the projecting position or else the contents of first and second counters 124, 130 are compared with the previously selected frame as fully explained hereinbefore, thus bringing Frame No. 18 to the projecting position.

It should be note here that although the Frame No. 1 is set as the index position in the above described embodiment, such index position can be any number, for example, 80, 73, etc., and that the series of numbers described as counted in the direction of the Y axis in the above embodiment can be so altered as to be counted in the direction of the X axis.

Although the present invention has been fully described by way of example with reference to the attached drawings, it is to be noted that various changes and modifications will be apparent to those skilled in the art. Therefore, unless otherwise such changes and modifications depart from the scope of the present invention, they should be construed as included therein.

What is claimed is:

1. In a microfiche reader apparatus in which a microfiche having number of frames so positioned to have one of the frames at a projecting position is moved therefrom to bring a designated frame to the projecting position for viewing of an enlarged image on a screen, said apparatus comprising a microfiche supporting means for supporting the microfiche thereon and being movable in the directions of first and second axes at right angles to each other, a control means for moving said supporting means supporting the microfiche with said one of the frame at the projecting position to bring the designated frame to the projecting position, said control means including a key means for specifying the particular frame of the microfiche by a series of numbers, said microfiche having a plurality of frames in rows and columns perpendicular to each other with each of the frames numbered in series, a clock pulse means for supplying a number of pulses equal to the number of the designated frame specified by said key means, a first counter for receiving and counting the pulses from said clock pulse means and a pulse subtractor associated with said first counter for subtracting one pulse supplied by said clock pulse means so that the number of pulses counted by said first counter is one less than the number of pulses supplied by said clock pulse means, a second counter associated with said first counter for being incremented by one every time a particular number of pulses is counted by said first counter, and means determining number of frames to be moved in the directions of said first and second axes by comparing the outputs from said first and second counters with the position of said supporting means for moving said supporting means to bring the designated frame to the projecting position.

2. In a microfiche reader apparatus in which a particular frame of a microfiche is brought to a projecting position for viewing of an enlarged image on a screen, said apparatus comprising a microfiche supporting means for supporting the microfiche thereon and being movable in the directions of first and second axes at right angles to each other, the microfiche carried by said supporting means initially being at an index position with an index frame at the projecting position, a control means for moving said supporting means so as to bring the particular frame of the microfiche to the projecting position from the index position, said control means including a key means for specifying the particular frame of the microfiche by a series of numbers, said microfiche having a plurality of frames in rows and columns perpendicular to each other with each of the frames numbered in series, a clock pulse means for supplying a number of pulses equal to the number of the particular frame specified by said key means, a first counter for receiving and counting the pulses from said clock pulse means and a pulse subtractor means connected with said first counter for subtracting one pulse supplied by said clock pulse means so that the number of pulses supplied to said first counter is one less than the number of pulses supplied by said clock means, a second counter associated with said first counter for being incremented by one every time a particular number of pulses is counted by said first counter, the outputs of said first and second counters being representative of required displacement of the microfiche by said supporting means in the first and second axes directions for bringing the particular frame to the projecting position from the index position.

3. In a microfiche reader appparatus in which a microfiche having number of frames so positioned to have one of the frames at a projecting position is moved therefrom to bring a designated frame to the projecting position for viewing of an enlarged image on a screen, the apparatus comprising a support means and a carrier means movable in the directions of first and second axes respectively at right angles to each other with said carrier means supporting the microfiche, said microfiche having a plurality of frames arranged in an array of positions in columns and rows at right angles to each other with each of the frames designated by one of a series of numbers, and control means for moving said support and carrier means to bring the designated frame of the microfiche to said projecting position including a key means for specifying the designated frame by said number, a clock pulse means for supplying number of pulses equal to the number of the designated frame specified by said key means, means for comparing the number specified by said key means with the number of pulses supplied from said clock pulse means and for disabling said clock pulse means upon coincidence of said numbers, a first counter for receiving and counting the pulses from said clock pulse means and a pulse subtractor associated with a first counter for subtracting the first pulse supplied by said clock pulse means so that the number of pulses counted by said first counter is one less than the number of pulses supplied by said clock pulse means, a second counter associated with said first counter for being incremented by one every time a particular number of pulses is counted by said first counter, means for determining the number of frames the microfiche is to be moved from the position where said one of the frames is at the projecting position including a first means associated with said support means and connected to said first counter for determining the number of frames to be moved by said support means in said first direction by comparing the output of said first counter with the position of said support means and a second means associated with said carrier means and connected to said second counter for determining the number of frames to be moved by said carrier means in said second direction by comparing the output of said second counter with the position of said support means for bringing the designated frame to the projection position.

4. In a microfiche reader apparatus in which a particular frame of a microfiche is brought to a projecting position for viewing of an enlarged image on a screen, said apparatus comprising a support means movable along a first axis, a carrier means supporting the microfiche and movable along a second axis at an angle to said first axis, said microfiche having a plurality of frames in an array at positions in columns and rows at the same angle as said axes and in which each of frames is designated by one of a series of numbers and initially being at an index position with an index frame at the projecting position, control means for moving said support means and said carrier means so as to bring the particular frame of the microfiche to the projecting position from the index position and including a key means for specifying the particular frame of the microfiche by said number, a first register for storing the number specified by said key means, pulse emission means for emitting a number of pulses equal to the number of the particular frame specified by said key means, gate means openable to pass pulses emitted by said emission means and closable to prevent passage of said pulses, pulse counter means receiving as input the pulses passed by said gate means and storing the cumulative total of said input pulses, a comparator receiving input indicative of the content of said pulse counter means for closing said gate means upon coincidence of the content stored in said first register and the content of said pulse counter, a pulse subtractor connected to said gate means for subtracting one from the total number of said pulses supplied by said emission means, and first and second counters associated with said pulse subtractor for dividing the number of said pulses which is one less than the total number of pulses passed through said gate means by a number equal to the number of rows in said array of the microfiche frames and for storing the quotient obtained thereby in said second counter and storing the remainder in said first counter, said remainder and quotient being representative of the required displacement of frames of the microfiche along said first and second axes respectively from said index position by said support and carrier means.

* * * * *